United States Patent [19]

Yamaki et al.

[11] 4,251,607
[45] Feb. 17, 1981

[54] NONAQUEOUS BATTERY WITH ORGANIC COMPOUND CATHODE

[75] Inventors: Junichi Yamaki; Akihiko Yamaji, both of Mito, Japan

[73] Assignee: Nippon Telegraph and Telephone Public Corporation, Tokyo, Japan

[21] Appl. No.: 109,138

[22] Filed: Jan. 2, 1980

[30] Foreign Application Priority Data

Jan. 26, 1979 [JP] Japan .................................. 54-7052
May 14, 1979 [JP] Japan .................................. 54-58015

[51] Int. Cl.³ ............................................. H01M 6/14
[52] U.S. Cl. ................................. 429/194; 429/199; 429/218
[58] Field of Search ............................. 429/194–197, 429/101–104, 191, 218, 199

[56] References Cited

U.S. PATENT DOCUMENTS

| Re. 27,835 | 12/1973 | Maricle et al. | 429/197 X |
| 2,993,946 | 7/1961 | Lozier | 429/195 X |
| 3,352,720 | 11/1967 | Wilson et al. | 429/213 |
| 4,009,052 | 2/1977 | Whittingham | 429/194 X |

FOREIGN PATENT DOCUMENTS

1216549 12/1970 United Kingdom .

*Primary Examiner*—Charles F. LeFevour
*Attorney, Agent, or Firm*—Frishauf, Holtz, Goodman & Woodward

[57] ABSTRACT

A battery embodying this invention comprises:
an anode including an anode-active material formed of one metal selected from the Group Ia metals or preferably lithium metal;
a cathode including a cathode-active material formed of metal or metal-free organic compounds having a phthalocyanine function or organic compounds having a porphin function; and
an electrolyte prepared from a material which is chemically stable to the cathode and anode materials and permits the migration of the ion of the anode metal to the cathode for electrochemical reaction with the cathode-active material.

14 Claims, 2 Drawing Figures

NONAQUEOUS BATTERY WITH ORGANIC COMPOUND CATHODE

BACKGROUND OF THE INVENTION

This invention relates to a battery, and more particularly to a battery whose anode contains as the anode active material a metal selected from the metals of Group Ia, whose cathode contains as the cathode active material a compound selected from the group consisting of organic compounds having a phthalocyanine function and organic compounds having a porphin function, and whose electrolyte is formed of a material which does not chemically react with the cathode and anode materials, and permits the migration of ions from the anode material to the cathode for electrochemical reactions with the cathode active material.

Hitherto known are numerous types of high energy density battery, in which lithium is used as an anode-active material. A lithium battery is already commercially available in which a cathode-active material is formed of, for example, fluorocarbon, $Ag_2CrO_4$, $MnO_2$ or $SOCl_2$. However, the prior art lithium batteries have the drawback that their capacity and energy density are not always quite satisfactory, and that these batteries are not capable of being recharged.

Among the secondary batteries using lithium as an anode-active material, a chalcogenide battery (refer to the U.S. Pat. No. 4,009,052) has the most excellent property in which a cathode-active material is formed of the sulfides, selenides or tellurides of titanium, zirconium, hafnium, niobium, tantalum or vanadium. Among the lithium batteries, the type in which titanium disulfide $TiS_2$ is used as a cathode-active material is already on the market. However, all the batteries known to date cannot be regarded as fully satisfactory in respect of property and economies. An attempt to use an organic compound as a cathode-active material is set forth in the British Pat. No. 1,216,549, in which a polymeric organic semiconductor such as polyaniline is used as a cathode. Also described in said British patent is a battery in which a copper phthalocyanine polymer is used as a cathode. However, the property of this battery is not clearly indicated. Further proposed are the following batteries:

(a) U.S. Pat. No. Re 27,835 in which a non-aqueous solvent type battery is formed by dissolving $SO_2$ in electrolyte to use a cathode-active material such as N,N,N',N'-tetramethyl benzidine which is soluble in a non-aqueous solvent type electrolyte.

(b) A lithium battery (U.S. Pat. No. 3,185,590) in which a cathode-active material is formed of a polymer of quinones, for example para-quinone;

(c) A lithium battery (Chemical Abstract 1,270,135 S, 1976, Vol 85) in which a cathode-active material is formed of 2,3-dichloro-5,6-dicyano-1,4-benzoquinone;

(d) A battery (Chemical Abstract 127,012 r, 1976, Vol 85) in which a cathode-active material is formed of bipyridine; and (e) A battery (U.S. Pat. No. 3,352,720) in which a cathode-active material formed of a complex compound of a halogen such as bromine with the nitrogen atoms of polymeric amine such as polyvinyl pyridine.

The above-listed proposed batteries have not yet proved quite satisfactory in respect of capacity and energy density. This invention has been proposed by way of eliminating the drawbacks of said batteries.

The primary object of this invention is to provide primary and secondary batteries, whose cathode-active material is composed of an organic compound having a phthalocyanine function.

Another object of the invention is to provide compact, light-weight primary batteries having large energy density.

Still another object of the invention is to provide secondary batteries which are capable of being discharged and charged over many cycles.

SUMMARY OF THE INVENTION

The invention is characterized in that with batteries which comprise an anode containing as the anode active material a metal selected from the Group Ia metals, a cathode, and an electrolyte which does not chemically react with the anode and cathode materials, and permits the migration of the ions from the anode material to the cathode for an electrochemical reaction with the cathode-active material, the cathode material contains as the cathode-active material a compound selected from the group consisting of organic compounds having a phthalocyanine function and organic compounds having a porphin function.

DETAILED DESCRIPTION

Figure 1:
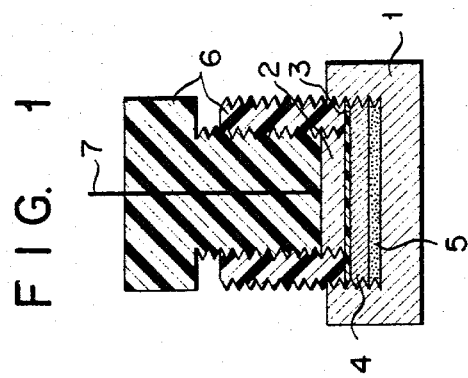
FIG. 1 is a vertical sectional view of a battery embodying this invention.

There will now be described the cathode, anode and electrolyte of a battery according to a preferred embodiment of this invention.

The cathode is formed of a material selected from the group consisting of metal or metal-free organic compounds having a phthalocyanine function and organic compounds having a porphin function.

(1) Metal or metal-free organic compounds having a phthalocyanine radical which are used as cathode-active materials preferably include:

Metal-free phthalocyanine; copper phthalocyanines such as α-copper phthalocyanine, β-copper phthalocyanine, and ϵ-copper phthalocyanine; zinc phthalocyanine; tin phthalocyanine; iron phthalocyanine; lead phthalocyanine; nickel phthalocyanine; vanadyl phthalocyanine; fluorochromium phthalocyanine; magnesium phthalocyanine; manganous phthalocyanine; dilithium phthalocyanine; aluminium phthalocyanine chloride; cadmium phthalocyanine; chlorogallium phthalocyanine; cobalt phthalocyanine; and silver phthalocyanine.

(2) Organic compounds having a porphin function preferably include:

Chlorophyll; hemoglobin; heme; copper chlorophylline sodium salt; and cytochrome C.

The cathode of the battery of this invention is formed by any of the following processes:

(a) pressing a powder of any of the above-listed cathode-active materials or a mixture of said powder and a powder of polytetrafluoroethylene binder in the form of a film on a support of, for example, nickel or stainless steel;

(b) mixing a powder of the cathode-active material with an inert electrically conductive powder of, for example, acetylene black, graphite, carbon, or nickel to render the mixed mass electrically conductive, further putting said mixture in a metal vessel with or without a powder of binder such as polytetrafluoroethylene and compressing the mixed mass; and (c) mixing the mixture of a powder of the cathode-active material and inert electrically conductive powder in a solution of a binder and spreading the resultant mixture on a support of, for example, nickel or stainless steel in the form of a film, followed by drying.

One example of this invention is to mix preferably 20 to 200% by weight of acetylene black based on the above described cathode active material and the said cathode-active material with an electrolyte and use the resultant pasty mass as cathode of the battery of the invention. Another example is to mix the cathode-active material with preferably about 10% by weight of a powder of polytetrafluoroethylene binder and preferably 20 to 200% by weight of acetylene black based on the cathode active material and press the mixture into a pellet at room temperature for use as the cathode of said battery.

The cathode-active material should have a high density of discharge energy in consideration of the property of a primary battery. Particularly preferred from this stand point are iron phthalocyanine, manganese phthalocyanine and metal-free phthalocyanine. Further, cobalt phthalocyanine, fluorochrome phthalocyanine, tin phthalocyanine dichloride and zinc phthalocyanine which have a high energy density are also preferred as cathode-active materials.

Referring to the charge and discharge characteristic of a secondary battery embodying this invention, the cathode-active material should preferably be formed of phthalocyanine compounds such as metal-free phthalocyanine, copper phthalocyanine and iron phthalocyanine.

There will now be described the anode of a battery embodying this invention. The anode-active material of the battery is formed of a metal selected from Group Ia metals, mixtures of said metals themselves or mixtures thereof with any other material. The anode-active material should preferably be formed of lithium. These anode-active materials are used as the anode in the form of a sheet or a sheet pressed on a metal net.

There will now be described the electrolyte of the battery of this invention.

The electrolyte should be the material which is chemically stable to the cathode and anode materials, and permits the migration of the ions of an anode metal to the cathode for electrochemical reaction with the cathode-active material. The electrolyte of the battery of the invention may be used in the form dissolved in a proper solvent, or the solid or molten form. The ion-conducting species of the electrolyte is desired to be the ion of an anode metal.

Particularly effective electrolytes are preferably LiClO$_4$, LiBF$_4$, LiPF$_6$, KClO$_4$, NaClO$_4$, sodium $\beta$-alumina and LiCl. Where the electrolyte is used in the form dissolved in a solvent, then said solvent should preferably be ketones, ethers, esters, organic lactones, organic nitriles, organic carbonates, nitrohydrocarbons and mixtures thereof. The solvent may be formed of, for example, propylene carbonate or a mixture of 50% of propylene carbonate and 50% of 1,2-dimethoxy ethane.

This invention will be more fully understood by reference to the examples which follow.

EXAMPLES 1 AND 2

Two different crystal structure metal-free phthalocyanines were used as a cathode active material. Further, one of said two phthalocyanines was used after heated 20 hours at 300° C. The columns (a), (b), (c) of Table 1 below show relative X-ray diffraction peak strengths of these metal-free phthalocyanines, when Cu K$_\alpha$ was used as a source of radiation.

TABLE 1

| Bragg angle 2θ | Metal-free phthalocyanine compounds | | |
|---|---|---|---|
| | (a) Example 1 | (b) Example 2 | (c) Example 2' |
| 6.6 degree | — | 100% | 100% |
| 7.0 degree | 29% | — | — |
| 7.2 degree | — | 70% | 63% |
| 9.0 degree | 30% | — | 16% |
| 13.4 degree | — | 28% | 24% |
| 14.1 degree | 100% | — | 13% |
| 14.7 degree | — | 61% | 67% |
| 15.4 degree | 24% | — | — |
| 15.7 degree | — | 34% | 38% |
| 16.4 degree | — | 18% | 24% |
| 18.0 degree | 22% | — | 10% |
| 19.3 degree | — | 3% | 6% |
| 20.3 degree | — | 6% | 10% |
| Crystal form* | β | α | Mixture of α and β |

*estimated from the cards of the American Standards of Testing Materials.

FIG. 1 is a vertical sectional view of a battery embodying this invention. Reference numeral 1 denotes a nickel-plated brass vessel provided with a circular recess having a diameter of 25 mm. 2 is a circular lithium anode plate having a diameter of 20 mm; 3 a circular porous polypropylene separator having a diameter of 25 mm; 4 a circular carbon fiber felt having a diameter of 25 mm and a thickness of 3 mm; 5 a cathode mixture; 6 a polytetrafluoroethylene vessel; and 7 a nickel lead wire. The cathode mixture 5 placed in the circular recess of the brass vessel 1. The circular carbon fiber felt 4 to be impregnated with electrolyte is mounted on said cathode mixture 5. The mass was compressed with one of the polytetrafluoroethylene vessel 6. The lithium anode 2 was set on the compressed mass with the porous polypropylene separator 3 interposed therebetween. The electrolyte used was formed of a 1 mol/l solution (2 to 5 cc) of LiClO$_4$ dissolved in propylene carbonate which was distilled and later dehydrated by adding molecular sieves. The porous polypropylene separator 3 and carbon fiber felt board 4 were impregnated with the electrolyte thus prepared. The cathode mixture 5 was prepared by mixing 0.1 g of a powder of metal-free phthalocyanine shown in the column (a) of Table 1 and 0.1 g of a powder of acetylene black with said electrolyte. A lithium sheet was used as the anode 2 with the porous polypropylene separator 3 disposed between said anode 2 and the carbon fiber felt 4.

A battery thus constructed was discharged at a constant current by means of a galvanostat. The discharge voltage of the battery was measured by a high input impedance type voltmeter. An output from the voltmeter was recorded on a pen recorder.

Figure 2:
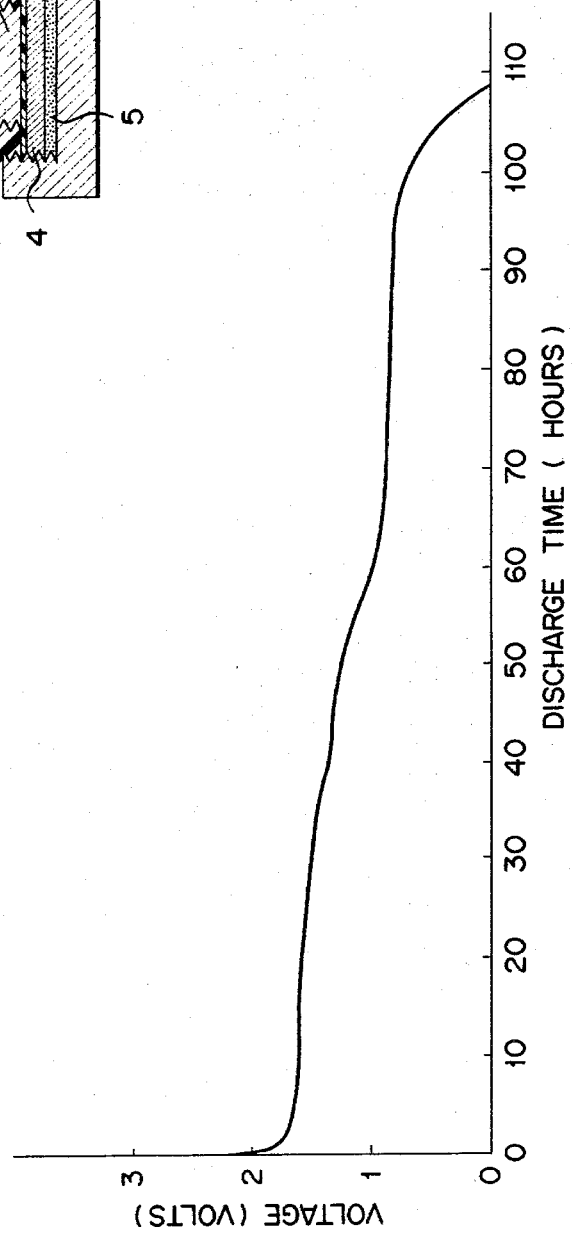
FIG. 2 is a curve diagram showing the relationship between discharge time and battery voltage for a battery according to this invention.

The battery constructed as described above was discharged for 58 hours at a current of 1.57 mA until the voltage dropped to 1 volt. In this case, the cathode-active material has a discharge capacity of 911 ampere-hour (Ah)/kg. The average voltage was 1.40 volts. The energy density was 1275 watt-hour (Wh)/kg. The open circuit voltage of the battery was 3 volts. FIG. 2 is a discharge curve diagram, showing variation in the voltage of said battery during the above-mentioned discharge. As seen from FIG. 2, the voltage slowly dropped as discharge proceeded, starting with the proximity of 1.6 volts, and fell to 1 volt in 58 hours. Later, the voltage gradient indicated a substantially flat curve in the proximity of 0.8 volt, and this voltage level remained practically uncharged, until discharge continued for about 100 hours in total.

A cathode mixture 5 wash prepared by mixing the same type of electrolyte as described above with a powder of metal-free phthalocyanine, shown in the column (a) of Table 1 and a powder of acetylene black blended together in the proportions given in Table 2 below in order to manufacture a battery shown in FIG. 1. Table 2 below indicates the discharge capacity and energy density of the metal-free phthalocyanine which were measured until said battery was discharged at the rate of 3.14 mA down to 1 volt.

TABLE 2

| Metal-free Phthalocyanine | Acetylene black | Discharge capacity of an active material until the voltage fell to 1 volt | Energy density of an active material until the voltage fell to 1 volt | Energy density of a cathode mixture until the voltage fell to 1 volt |
| --- | --- | --- | --- | --- |
| 0.5 g  | 0.1 g | 125 Ah/kg | 175 Wh/kg  | 146 Wh/kg |
| 0.1 g  | 0.1 g | 691 Ah/kg | 970 Wh/kg  | 485 Wh/kg |
| 0.05 g | 0.1 g | 722 Ah/kg | 1040 Wh/kg | 347 Wh/kg |
| 0.01 g | 0.1 g | 785 Ah/kg | 1060 Wh/kg | 96 Wh/kg  |

The active material given in Table 2 above denotes metal-free phthalocyanine. The cathode mixture shown in Table 2 above is formed of metal-free phthalocyanine blended with acetylene black. From the energy density per unit amount of the cathode mixture, it is preferred that the metal-free phthalocyanine be added at the rate of 0.5 to 0.05 g per 0.1 g of acetylene black, namely, 20 to 200% by weight of the acetylene black based on the phthalocyanine be added to the metal-free phthalocyanine.

A battery was manufactured under substantially the same conditions as in Example 1, except that 0.07 g of a powder of metal-free phthalocyanine having an X-ray diffraction peak given in the column (b) of Table 1 and 0.07 g of a powder of acetylene black were blended together to provide a cathode mixture (Example 2).

Where the battery was discharged at the rate of 1 mA, then the cathode-active material indicated a discharge capacity of 514 Ah/kg, and an energy density of 745 Wh/kg until the voltage of the battery dropped to 1 volt.

Thereafter, metal-free phthalocyanine having an X-ray diffraction peak shown in the column (b) of Table 1 was vacuum sealed in a quartz tube and heated 20 hours at 300° C. The heat treated phthalocyanine had an X-ray diffraction peak shown in the column (c) of Table 1. A battery was manufactured in substantially the same manner as described above, except that the cathode-active material was formed of said metal-free phthalocyanine having the X-ray diffraction peak indicated in the column (c) of Table 1 (Example 2'). Where the battery as discharged at the rate of 1 mA, then the cathode-active material indicate a discharge capacity of 800 Ah/kg and an energy density of 1200 Wh/kg. It was made clear that the heat treatment of the metal-free phthalocyanine having an X-ray diffration peak shown in the column (b) of Table 1 increased the energy density.

Judging from the position of an X-ray diffraction peak, the metal-free phthalocyanines shown in the columns of (a), (b) and (c) of Table 1 are respectively assumed to have crystal forms $\beta$, $\alpha$, and $\alpha + \beta$.

EXAMPLE 3

0.05 g of a powder of metal-free phthalocyanine having an X-ray diffraction peak shown in the column (a) of Table 1, 0.04 g of a powder of acetylene black and 0.01 g of a powder of polytetrafluoroethylene were mixed. The mixture was pressed into a pellet having a diameter of 13 mm and a thickness of 0.6 mm. Glass cloth was used to provide a separator. A lithium board having a diameter of 17 mm and a thickness of 1 mm was used as an anode. The above-mentioned pellet was used as a cathode. An electrolyte was prepared from a 1 N solution formed of $LiClO_4$/propylene carbonate and a 1 N solution formed of $LiClO_4$/dimethoxyethane mixed in the ratio of 1:1. When discharged at the constant rate of 300 µA, said battery continued said discharge for 49 hours and indicated a discharge capacity of 294 Ah/kg and an energy density of 412 Wh/kg until the voltage fell to 1 volt.

EXAMPLE 4

A battery was manufactured in substantially the same manner as in Example 1, except that 0.1 g of a powder of any of the metallophthalocyanines listed in Table 3 below and 0.1 g of a powder of acetylene black were blended to provide a cathode mixture. Most of the metallophthalocyanines were purchased from Eastman Company. Table 3 sets forth the important ones of the Bragg angles defined by the listed metallophthalocyanines on the low angle side. The character (s) denotes a strong peak and the character (w) represents a weak peak. The batteries thus manufactured were discharged at the same rate of current as in Example 1.

TABLE 3

Measured X-ray diffraction peaks of metallophthalocyanines (radiation source : Cu $K_\alpha$)

| Metallo-phthalo-cyanines | Bragg angle (2θ) | | | | |
| --- | --- | --- | --- | --- | --- |
| α-CuPc* | 6.9 (s) | 7.4 (s) | 10.0 | 13.6 (w) | 14.8 (w) |
| β-CuPc | 7.0 (s) | 9.2 (s) | 10.5 | 12.5 | 14.1 (w) |
| ε-CuPc | 7.7 (s) | 9.2 (s) | 11.3 (w) | 14.3 (w) | 17.6 |
| Fe Pc | 6.9 (s) | 8.0 (w) | 9.8 (w) | 13.0 (w) | 15.5 |
| SnCl₂Pc | 7.5 (w) | 8.4 (s) | 8.7 | 10.6 (w) | 11.1 (w) |
| FCrPc | 6.9 (s) | 9.8 | 15.5 | 22.0 (w) | 23.5 |
| Ag Pc | 7.1 | 9.2 | 10.6 (w) | 12.6 (w) | 18.3 (w) |
| Mg Pc | 5.1 (w) | 6.8 (s) | 8.7 | 12.1 | 13.8 |
| Mn Pc | 6.9 (s) | 7.8 (w) | 9.8 (w) | 15.5 | 16.5 (w) |
| Co Pc | 7.0 (s) | 9.1 | 14.1 | 15.5 | 18.1 |
| Zn Pc | 7.0 (s) | 9.2 (s) | 10.6 | 12.6 | 14.1 (w) |
| Ni Pc | 7.1 (s) | 8.9 | 10.0 | 10.4 | 12.3 |
| AlCl₂Pc | 6.8 | 11.3 | 13.7 | 16.8 | 25.8 |
| Li₂Pc | 7.3 (s) | 9.0 (w) | 13.6 | 14.9 (s) | 15.9 |

TABLE 3-continued

Measured X-ray diffraction peaks of metallophthalocyanines (radiation source : Cu Kα)

| Metallo-phthalo-cyanines | Bragg angle (2θ) | | | | |
| --- | --- | --- | --- | --- | --- |
| AlClPc | 7.1 | 11.4 | 14.2 (w) | 17.1 | 25.7 |
| Cd Pc | 6.5 (s) | 7.2 | 9.0 (w) | 10.0 | 13.6 |
| VO Pc | 7.6 (s) | 10.2 (w) | 12.6 (w) | 13.2 (w) | 15.2 |
| GaClPc | 7.6 (s) | 10.8 | 12.8 | 13.2 | 16.7 |

*Pc = phthalocyanine

Tables 4(a) and 4(b) below indicate the discharge capacity and energy density of the respective cathode-active materials until the voltage dropped to 1 volt.

TABLE 4(a)

Measured properties of metallo-phthalocyanines used as cathode-active materials (discharged at the rate of 1mA)

| Cathode active material | ** OCV (V) | *** Discharge capacity (Ah/kg) | *** Energy density (Wh/kg) |
| --- | --- | --- | --- |
| ε-CuPc* | 3.1 | 600 | 900 |
| Fe Pc | 3.27 | 1440 | 2300 |
| Zn Pc | 3.0 | 800 | 1040 |
| SnCl₂Pc | 3.05 | 700 | 1120 |
| Mn Pc | 3.2 | 1400 | 2240 |
| FCrPc | 3.1 | 950 | 1330 |
| Cd Pc | 2.9 | 400 | 560 |
| Co Pc | 3.1 | 850 | 1530 |
| VO Pc | 3.15 | 700 | 980 |

TABLE 4(b)

Measured properties of metallo-phthalocyanines used as cathode-active materials (discharged at the rate of 3.14 milliamperes)

| Cathode active material | ** OCV (V) | *** Discharge capacity (Ah/kg) | *** Energy density (Wh/kg) |
| --- | --- | --- | --- |
| α-CuPc* | 3.1 | 236 | 307 |
| β-CuPc | 3.15 | 241 | 337 |
| ε-CuPc | 3.1 | 408 | 530 |
| VO Pc | 3.1 | 157 | 220 |
| Zn Pc | 3.0 | 314 | 408 |
| Mg Pc | 2.9 | 345 | 449 |
| Ag Pc | 3.07 | 330 | 462 |
| Fe Pc | 3.26 | 455 | 728 |
| FCrPc | 3.1 | 440 | 527 |
| Cd Pc | 2.9 | 188 | 244 |
| Mn Pc | 3.2 | 283 | 425 |
| Co Pc | 3.1 | 276 | 414 |
| AlClPcCl | 3.05 | 236 | 353 |
| SnCl₂Pc | 3.05 | 377 | 603 |
| Ni Pc | 3.12 | 283 | 368 |
| Li₂Pc | 3.02 | 220 | 330 |
| AlClPc | 3.07 | 195 | 293 |
| GaClPc | 3.04 | 66 | 86 |

*Pc = phthalocyanine
**OCV = open circuit voltage
***Measured until the voltage dropped to 1 volt In Table 4(a), Fe Pc and Mn Pc show excellent properties. Where a discharge current is increased, the discharge capacity and energy density generally fall.

In Table 4(b), Fe Pc, SnCl₂Pc and FCrPc display excellent properties. Since, in the case of Table 4(b), discharge was made at a larger rate of current than in the case of Table 4(a), Table 4(b) sets forth smaller values of discharge capacity and energy density.

EXAMPLE 5

0.05 g of a powder of iron phthalocyanine, 0.05 g of a powder of acetylene black and 0.01 g of a powder of polytetrafluoroethylene were mixed. The mixture was pressed into a pellet having a diameter of 13 mm and a thickness of 0.6 mm. Glass cloth was used as a separator. A lithium board having a diameter of 17 mm and a thickness of 1 mm was used as an anode. The pressed pellet was applied as a cathode. An electrolyte was formed of a 1 N solution of LiClO₄/propylene carbonate and a 1 N solution of LiClO₄/dimethoxyethane mixed in the ratio of 1:1. When discharge at the constant rate of 300 μA, the battery thus manufactured continued said discharge for 75 hours and indicated a discharge capacity of 450 Ah/kg and an energy density of 720 Wh/kg until the voltage of the battery dropped to 1 volt.

EXAMPLE 6

A cathode mixture 5 was prepared by mixing 0.1 g of a powder of copper-chlorophylline sodium salt and 0.1 g of a powder of acethylene black with the same electrolyte as used in Example 1. A battery shown in FIG. 1 was manufactured substantially in the same manner as in Example 1. Where the battery thus manufactured was discharged at the constant rate of 1 mA, the cathode-active material indicated a discharge capacity of 40 Ah/kg and an energy density of 48 Wh/kg until the voltage fell to 1 volt, and a discharge capacity of 460 Ah/kg until the voltage of the battery dropped to 0.2 volt.

EXAMPLE 7

A cathode mixture 5 was prepared by mixing 0.1 g of a powder of cytochrome C having a molecular weight of 12,000 to 18,000 and 0.1 g of a powder of acetylene black with the same electrolyte as used in Example 1. A battery shown in FIG. 1 was manufactured in substantially the same manner as in Example 1. Where the battery thus manufactured was discharged at the constant rate of 1 mA, the cathode-active material indicated a total discharge capacity of 60 Ah/kg and an energy density of 72 Wh/kg until the voltage of the battery dropped to 1 volt.

EXAMPLE 8

A cathode mixture 5 was prepared by mixing 0.03 g of a powder of metal-free phthalocyanine having an X-ray diffraction peak shown in the column (a) of Table 1 and 0.1 g of a powder of acetylene block with the same electrolyte as used in Example 1. A battery shown in FIG. 1 was manufactured in substantially the same manner as in Example 1. To determine the properties of a secondary battery, the battery thus manufactured was discharged for 1.5 hours at the rate of 3.14 mA. The discharge was later stopped for half an hour. The battery was charged for 1.5 hours at the rate of 3.14 mA. The charge was later stopped for half an hour. The above-mentioned cycle of discharge and charge was repeated 99 times. The cathode-active material indicated a discharge capacity of about 750 Ah/kg until the voltage of the battery dropped to 1 volt. Therefore, the above-mentioned cycle of charge and discharge corresponds to a capacity of 20%. During the aforesaid 99 cycles of charge and discharge, the battery indicated a minimum discharge voltage of over 1 volt and a maximum charge voltage of less than 4.6 volts. Further, the battery indicated a minimum voltage of 1.1 volt at the 99th discharge, and a maximum voltage of 4.3 volts at the 99th charge. After the above-mentioned 99 cycles of charge and discharge, the battery was discharged for 3 hours at the rate of 3.14 mA. The discharge was stopped for half an hour. Later, the battery was charged for 3 hours at the rate of 3.14 mA. The charge was stopped for half an hour. This cycle of charge and discharge was repeated 16 times. The above-mentioned cycle of charge and discharge corresponds to a 40% capacity. During the 16 cycles of charge and discharge, the battery indicated a minimum discharge voltage of over zero volt, and a minimum discharge voltage of about 0.5 volt on the average.

EXAMPLE 9

A cathode mixture 5 was prepared by mixing 0.03 g of a powder of metal-free phthalocyanine having an X-ray diffraction peak shown in the column (a) of Table 1 and 0.03 g of a powder of acetylene black with the same electrolyte as used in Example 1. A battery illustrated in FIG. 1 was manufactured in substantially the same manner as in Example 1. The battery thus manufactured was discharged for 18 hours at the rate of 0.785 mA. The disharge was stopped for 6 hours. Later, the battery was charged for 18 hours at the rate of 0.785 mA. The charge was stopped for 6 hours. This cycle of charge and discharge was repeated. The cathode-active material indicated a discharge capacity of 750 Ah/kg until the voltage of the battery dropped to 1 volt. Therefore, the above-mentioned cycle of charge and discharge corresponds to 63% capacity. The maximum charge voltage was limited to 6 volts. The minimum discharge voltage was 1.10 volts in the 1st cycle, 1.23 volts in the 2nd cycle, 1.13 volts in the 3rd cycle, 1.18 volts in the 4th cycle, 1.00 volt in the 5th cycle, 0.98 volt in the 6th cycle, 0.88 volt in the 7th cycle and 0.90 volt in the 8th cycle.

EXAMPLE 10

A cathode mixture 5 was prepared by mixing 0.03 g of a powder of metal-free phthalocyanine having an X-ray diffraction peak in the column (a) of Table 1 and 0.03 g of a powder of acetylene black with the same electrolyte as used in Example 1. A battery shown in FIG. 1 was manufactured in substantially the same manner as in Example 1. The battery thus manufactured was discharged for 18 hours at the rate of 1 mA. The discharge was stopped for 6 hours. Later the battery was charged for 18 hours at the rate of 1 mA. The charge was stopped for 6 hours. The cycle of said charge and discharge was repeated. Since the cathode-active material indicated a discharge capacity of 750 Ah/kg until the voltage of the battery dropped to 1 volt, the cycle of the above-mentioned charge and discharge corresponds to a 80% capacity. The minimum discharge voltage was 1.07 volts in the 1st cycle, 1.10 volts in the 2nd cycle, 0.92 volt in the 3rd cycle, 0.72 volt in the 4th cycle, 0.98 volt in the 5th cycle and 0.60 volt in the 6th cycle.

EXAMPLE 11

A cathode mixture 5 was prepared by mixing 0.03 g of a powder of α-copper phthalocyanine and 0.1 g of a powder of acetylene black with the same electrolyte as used in Example 1. A battery shown in FIG. 1 was manufactured in substantially the same manner as in Example 1. The battery thus manufactured was discharged for 1.5 hours at the rate of 3.14 mA. The discharge was stopped for half an hour. Later, the battery was charged for 1.5 hours at the rate of 3.14 mA. The charge was stopped for half an hour. The cycle of the above-mentioned charge and discharge was repeated. This cycle correponds to a capacity of 156 Ah/kg for the α-copper phthalocyanine. The minimum discharge voltage in the 1st cycle was 1.6 volts. Even in the 99th cycle, the minimum discharge voltage indicated 1.4 volts. Throughout the cycle, a maximum charge voltage was always lower than 4 volts. The battery repeatedly charged and discharged 99 times as described above was further discharged for 3 hours at the rate of 3.14 mA. The discharge was stopped for half an hour. Later, the battery was charged again for 3 hours at the rate of 3.14 mA. The charge was stopped for half an hour. This cycle of charge and discharge corresponds to a capacity of 321 Ah/kg for the α-copper phthalocyanine. The results of the experiments are set forth in Table 5 below.

TABLE 5

| Frequency of charge and discharge cycles | Minimum discharge voltage (volts) | Maximum charge voltage (volts) |
|---|---|---|
| 1 | 1.12 V | 4.15 V |
| 5 | 1.02 V | 4.17 V |
| 10 | 0.98 V | 4.12 V |
| 15 | 0.65 V | 4.18 V |
| 20 | 0.32 V | 4.20 V |
| 25 | 0.06 V | 4.30 V |
| 30 | −0.56 V | 4.43 V |
| 32 | −1.27 V | 4.66 V |

As apparent from Table 5 above, a minimum discharge voltage averaged a higher level than substantially 1 volt throughout 10 cycles of charge and discharge. Approximately the same results were obtained with respect to ε-copper phthalocyanine.

EXAMPLE 12

A battery shown in FIG. 1 was manufactured in substantially the same manner as in Example 1, except that a cathode mixture 5 was prepared by mixing 0.03 g of a powder of iron phthalocyanine and 0.03 g of a powder of acetylene black with the same electrolyte as used in Example 1. The battery thus manufactured was discharged for 6 hours at the rate of 1 mA. The discharge was suspended for 2 hours. Later, the battery was charged for 6 hours at the rate of 1 mA. The charge was stopped for 2 hours. The cycle of said charge and discharge was repeated. This cycle corresponds to a capacity of 200 Ah/kg for the iron phthalocyanine. The minimum discharge voltage was 1.7 volts in the 1st cycle, 1.6 volts in the 2nd cycle, 1.4 volts in the 3rd cycle, 1.4 volts in the 4th cycle, 1.4 volts in the 5th cycle, 1.4 volts in the 6th cycle, 1.3 volts in the 7th cycle, 1.2 volts in the 8th cycle, 1.0 volt in the 9th cycle, 1.0 volt in the 10th cycle and 0.9 volt in the 11th cycle.

EXAMPLE 13

A battery shown in FIG. 1 was manufactured in substantially the same manner as in Example 1, except that a cathode mixture 5 was prepared by mixing 0.03 g of a powder of cobalt phthalocyanine and 0.03 g of a powder of acetylene black with the same electrolyte as used in Example 1. The battery thus manufactured was discharged for 6 hours at the rate of 1 mA. The discharge was suspended for 1 hour. Later, the battery was charged for 6 hours at the rate of 1 mA. The charge was stopped for 1 hour. The cycle of said charge and discharge was repeated. This cycle corresponds to a capacity of 200 Ah/kg for the cobalt phthalocyanine. The minimum discharge voltage was 1.72 volts in the 1st cycle, 1.80 volts in the 2nd cycle, 1.75 volts in the 3rd cycle, and 1.0 volt in the 14th cycle. In the 19th cycle, the minimum discharge voltage was 1 volt by a discharge of 167 Ah/kg. In the 21st cycle, the minimum discharge voltage was 1 volt by a discharge 133 Ah/kg.

EXAMPLE 14

A battery shown in FIG. 1 was manufactured in substantially the same manner as in Example 1, except that a cathode mixture 5 was prepared by mixing 0.03 g of a powder of manganous phthalocyanine and 0.03 g of a powder of acetylene black with the same electrolyte as used in Example 1. The battery thus manufactured was discharged for 6 hours at the rate of 1 mA. The discharge was suspended for 1 hour. Later, the battery was charged for 6 hours at the rate of 1 mA. The charge was stopped for 1 hour. The cycle of said charge and discharge was repeated. This cycle corresponds to a capacity of 200 Ah/kg for the manganese phthalocyanine. The minimum discharge voltage was 1.85 volts in the 1st cycle, 1.86 volts in the 2nd cycle, 1.5 volts in the 3rd cycle and 1.0 volt in the 10th cycle.

What we claim is:

1. A battery which comprises:
   an anode containing one metal selected from the Group Ia metals;
   a cathode containing one compound selected from the group consisting of organic compounds having a phthalocyanine function and organic compounds having a porphin function; and
   a nonaqueous electrolyte which does not chemically react with the anode and cathode materials, and permits the migration of the ions of the anode material to the cathode for electrochemical reaction with the cathode-active material.

2. The battery according to claim 1, wherein the cathode contains one compound selected from the group consisting of metal-free phthalocyanine; α-copper phthalocyanine; β-copper phthalocyanine; ε-copper phthalocyanine; zinc phthalocyanine; tin phthalocyanine; iron phthalocyanine; lead phthalocyanine; nickel phthalocyanine; vanadyl phthalocyanine; fluorochromium phthalocyanine; magnesium phthalocyanine; manganous phthalocyanine; dilithium phthalocyanine; aluminium phthalocyanine chloride; cadmium phthalocyanine; chlorogallium phthalocyanine; cobalt phthalocyanine; and silver phthalocyanine.

3. The battery according to claim 1, wherein the cathode contains a compound selected from the group consisting of copper chlorophyllin sodium salt, and cytochrome C.

4. The battery according to claim 1, wherein the anode contains of lithium.

5. The battery according to claim 1, wherein the electrolyte is a solution prepared by dissolving LiClO$_4$ in propylene carbonate.

6. The battery according to claim 2, wherein the metal-free phthalocyanine has such a structure that X-ray diffraction peaks based on Cu K$_\alpha$ used as a radiation source appear at Bragg angles of 7.0°, 9.0°, 14.1°, 15.4° and 18.0°.

7. The battery according to claim 2, wherein the metal-free phthalocyanine has such a structure that X-ray diffraction peaks based on Cu K$_\alpha$ used as a radiation source appear at Bragg angles of 6.6°, 7.2°, 9.0°, 13.4°, 14.1°, 14.7°, 15.7°, 16.4°, 18.0°, 19.3° and 20.3°.

8. The battery according to claim 2, wherein the copper phthalocyanine has such a structure that X-ray diffraction peaks based on Cu K$_\alpha$ used as a radiation source appear at Bragg angles of 7.7°, 9.2°, 11.3°, 14.3° and 17.6°.

9. The battery according to claim 2, wherein the copper phthalocyanine has an α-type structure.

10. The battery according to claim 1, wherein the cathode is prepared by mixing metal-free phthalocyanine whose X-ray diffraction peaks based on Cu K$_\alpha$ used as a radiation source appear at Bragg angles of 7.0°, 9.0°, 14.1°, 15.4° and 18.0° with 20 to 200% by weight of a powder of acetylene black based on said metal-free phthalocyanine; the anode contains lithium metal; and the electrolyte is prepared by dissolving LiClO$_4$ in propylene carbonate.

11. The battery according to claim 1, wherein the cathode is prepared by mixing iron phthalocyanine with 20 to 200% by weight of a powder of acetylene black based on said iron phthalocyanine; the anode contains lithium metal; and the electrolyte is prepared by dissolving LiClO$_4$ in propylene carbonate.

12. The battery according to claim 1, wherein the cathode is prepared by mixing manganous phthalocyanine with 20 to 200% by weight of a powder of acetylene black based on said manganous phthalocyanine; the anode contains lithium metal; and the electrolyte is prepared by dissolving LiClO$_4$ in propylene carbonate.

13. The battery according to claim 1, wherein the cathode is propared by mixing cobalt phthalocyanine with 20 to 200% by weight of a powder of acetylene black based on said cobalt phthalocyanine; the anode contains lithium metal; and the electrolyte is prepared by dissolving LiClO$_4$ in propylene carbonate.

14. The battery according to claim 1, wherein the cathode is prepared by mixing copper phthalocyanine with 20 to 200% by weight of a powder of acetylene black based on said copper phthalocyanine; the anode contains lithium metal; and the electrolyte is prepared by dissolving LiClO$_4$ in propylene carbonate.

* * * * *